United States Patent [19]

Bloom

[11] 3,884,831

[45] May 20, 1975

[54] CATALYST SYSTEM AND METHOD FOR IMPROVING THE LEACHING OF ELEMENTS SUCH AS COPPER FROM THEIR ORES USING THE CATALYST SYSTEM

[76] Inventor: Stanley H. Bloom, 6747 Hillwood Ln., Dallas, Tex. 75240

[22] Filed: Feb. 16, 1973

[21] Appl. No.: 333,321

Related U.S. Application Data

[63] Continuation of Ser. No. 131,553, April 5, 1971, abandoned, which is a continuation-in-part of Ser. No. 749,564, Aug. 2, 1968, abandoned.

[52] U.S. Cl. ............................. 252/429 R; 75/103
[51] Int. Cl. ............................................ C22b 3/00
[58] Field of Search ............... 252/429 R; 23/312 R; 75/103

[56] References Cited
UNITED STATES PATENTS

| | | | |
|---|---|---|---|
| 1,084,600 | 1/1914 | Best | 75/101 |
| 2,730,493 | 1/1956 | Carlson | 23/312 X |

*Primary Examiner*—Patrick P. Garvin
*Attorney, Agent, or Firm*—Wolfe, Hubbard, Leydig, Voit & Osann, Ltd.

[57] ABSTRACT

A catalyst system, and the process for improving the leaching of elements from their ores using the catalyst system, which system includes a free chloride ion source, a free nitrate ion source, an ammonium ion source and an anionic hydrophile dissolved in a polar solvent such as water. A non-ionic hydrophile may also be desirably incorporated in the system.

5 Claims, No Drawings

CATALYST SYSTEM AND METHOD FOR IMPROVING THE LEACHING OF ELEMENTS SUCH AS COPPER FROM THEIR ORES USING THE CATALYST SYSTEM

This application is a continuation of application Ser. No. 131,553, filed Apr. 5, 1971, now abandoned which application is a continuation-in-part application of my pending application, Ser. No. 749,564, filed Aug. 2, 1968, now abandoned.

This invention relates to the production of various elements and, more particularly, to the hydrometallurgic leaching of various elements from either their ores or scrap metal.

In hydrometallurgy, as applied to metal-bearing ores such as copper, the ore is treated with a dilute mineral acid aqueous solution, typically a dilute sulphuric acid aqueous solution known as the "mother liquor", to remove the copper in the form of copper ions which are soluble in the aqueous mother liquor. The copper may then be recovered from the solution by either electrodeposition or by precipitation with metallic iron.

The commercial feasibility of the leaching operation depends upon such factors as the length of time required, the extent of the yield, the amount of the mineral acid required and the electric power or metallic iron required for recovery. Considerable effort and research have been directed towards improving the efficiency of the leaching operation. For example, some of the materials which have been used in an attempt to improve the leaching operation include sulphuric acid substitutes, ferric chloride, ferrous sulphate, ferric sulphate, cupric chloride, sodium chloride, hydrochloric acid, chlorine and nitric acid.

It is an object of the present invention to provide an improved leaching process characterized by the development of a desirable environment for the dissolution of the ore.

Another object is to significantly shorten the time required for the dissolution of the ore and to increase the quantity of the ions of the element in the mother liquor so as to markedly decrease the extraction-recovery time.

A further object of the present invention provides a catalyst which may be readily used simply by adding directly to the ore-mother liquor slurry.

A still further object is to provide a catalyst system that is generally non-corrosive, non-toxic, biodegradable and non-polluting.

Yet another object lies in the provision of achieving all of the herein benefits at no cost beyond conventional leaching techniques save for the cost of the catalyst.

Other objects and advantages will be apparent from the description of the invention hereinafter.

While the invention is susceptible to various modifications and alternative forms, specific embodiments thereof will be described in detail herein. It should be understood, however, that it is not intended to limit the invention to the particular forms disclosed, but, on the contrary, the intention is to cover all modifications, equivalents and alternatives falling within the spirit and scope of the invention as expressed in the appended claims. Thus, while the present invention will be described in connection with the recovery of copper from its ores, it should be appreciated that the catalyst system of the present invention may be similarly employed to recover various other elements such as cobalt, nickel, zinc, uranium, cadmium, tin, thorium or silver from their ores or scrap containing the elements.

In a typical vat leach operation, one ton of the copper-bearing ore may be leached with a mother liquor comprising, for example, about 250 gallons of an aqueous sulphuric acid having up to about 10% by weight of acid. To this mother liquor, the multi-component synergistic catalytic system of the present invention is added. Thus, in accordance with the present invention, the catalytic system includes a free chloride ion source, a free nitrate ion source, an ammonium ion source, an anionic hydrophile dissolved in a polar solvent such as water. Desirably, a non-ionic hydrophile may also be included.

It is theorized that the catalyst of the present invention functions to increase the solubility of the copper ions in the ore by increasing the solubilizing action of the mother liquor and also by decreasing the surface tension at the ore-mother liquor interface so as to improve the wetting of the ore by the mother liquor. Further, the catalyst is believed to improve the transportation of the copper ions from the ore-mother liquor interface into the bulk mother liquor.

As a specific example of a catalyst system in accordance with the present invention, there is included, for a 55-gallon batch, 15 pounds of ammonium chloride, 15 pounds of ammonium nitrate, 15 pounds of ammonium sulphate, 8 ounces of sodium dodecylated-oxydibenzene disulfonate whose distribution mean gram molecular weight is about 756.96, 2 ounces of alkylphenoxypoly (ethylene oxy) ethanol whose distribution mean gram molecular weight is about 436.6 and the remainder water. As such, it is preferred to employ about one part by weight of the catalyst to from about 100 to about 10,000 parts by weight of the mother liquor.

To provide the chloride ion, any material containing a chloride ion can be used so long as it will provide a free chloride ion in the acid environment of the mother liquor and is, of course, soluble therein. Representative examples of suitable materials include ammonium chloride, hydrogen chloride, lithium chloride, potassium chloride, and sodium chloride. It is preferred to use ammonium chloride so that a separate source of an ammonium ion is not needed or, at least, needed only in a smaller quantity.

Similarly, as to the source of the nitrate ion, any nitrate compound may be employed so long as the source provides free nitrate ions in the acid mother liquor environment and is soluble therein. Among the materials which are suitable include the following representative examples: ammonium nitrate, nitric acid, lithium nitrate, potassium nitrate and sodium nitrate. Again, to minimize the number of ingredients which have to be employed, it is preferred to use ammonium nitrate so that a source of an ammonium ion is also provided. It should, of course, be appreciated that ammonium nitrate, particularly in the dry state, should be carefully handled because of its explosive character.

It is believed that the free chloride ions and the free nitrate ions in the acid environment of the mother liquor serve to increase the rate of removal of the copper ions from the ore by dissolution. Stated another way, it is theorized that the free nitrate and chloride ions function together in the acidic mother liquor to speed the solubilizing of the copper ions, perhaps by forming aqua regia under the acidic aqueous conditions.

While it is preferred to utilize ammonium chloride and ammonium nitrate as the chloride and nitrate ion sources so that a separate source of ammonium ions is not necessary, any other source which may be dissolved in the polar solvent employed can likewise be used. Typical examples include ammonium sulphate, ammonium sulfite, ammonium fluoride and ammonium bifluoride. The ammonium ions aid in transporting the solubilized copper ions into the bulk mother liquor and also diminish or obviate the interference that can be caused by ferrous, ferric and aluminum ions by preferentially forming acidic, stable, soluble non-occluding alums with such ions. This minimizes the formation of gels and colloids which would diminish the copper yield.

To serve as the anionic hydrophile, virtually any such hydrophile may be employed so long as the hydrophile is soluble in the polar solvent and in the mother liquor. Any of the following types may be used: soaps, sulfated soaps, sulfated amides, sulfated alcohols, sulfated ethers, sulfated carboxylic acids petroleum sulfonates, sulfonated aromatic hydrocarbons, sulfonated aliphatic hydrocarbons, sulfonated aromatic-aliphatic hydrocarbons, sulfonated amides, sulfonated ethers, acylated amino acids, acylated polypeptides and metal alkyl phosphates. Representative examples include sodium dodecylatedoxydibenzene disulfonate, sodium lauryl sulphate, sodium N-alkylcarboxy sulfosuccinate, sodium alkylsulfosuccinate, polyalkanolamine-fatty acid condensate, sodium alkylbiphenyl sulfonate, sodium alkyl-naphthalene sulfonate and sodium dodecylbenzene sulfonate. The anionic hydrophile serves to lower the surface tension of the mother liquor at the ore-mother liquor interface which increases the exposure of the ore to the mother liquor so as to increase the rate of solubilizing of the copper ions. Also, and perhaps more importantly, the hydrophile acts as a complexing-transporting agent for the solubilized copper ions.

A small amount of a non-ionic hydrophile may also optionally be employed to improve the wetting of the ore with the mother liquor by decreasing the surface tension and also to assist in creating a more favorable environment for the dissolution of the ore bed into the bulk mother liquor. Any non-ionic hydrophile that is capable of exhibiting such characteristics, so long as the material is soluble in both the catalyst solvent and the mother liquor, could be used. Typical types of suitable hydrophiles include esters of polyhydric alcohols, alkoxylated amides, esters of polyoxyalkylene glycols, ethers of polyoxyethylene glycols, alkylolamide-fatty acid condensates, tertiary acetylenic glycols and dialkylpolyoxyalkylene phosphates. It is preferred to employ a non-ionic ethanol hydrophile having a molecular weight from about 78 to about 250. Other specific examples include alkyl aryl polyoxyethylene ether and polyoxyethylene alkyl thiether.

Because of availability and economy, it is preferred to employ water as the polar solvent for the catalyst system. However, it should be appreciated that other solvents could be used so long as they ionize the source of the ammonium ions, the nitrate ions and the chloride ions.

Optionally, a source of free sulphate ions may also be included where a sulphuric acid solution is not used as the mother liquor to assist in complexing the interfering metal ions as non-occluding alums. Desirably, ammonium sulphate may be employed as the source.

In accordance with one aspect of the present invention, the catalyst is formulated by dissolving the source of the nitrate and sulphate in the polar solvent. The hydrophiles are then added and, lastly, the source of the chloride. As a specific example, to provide 55 gallons of the catalyst, 15 pounds of ammonium nitrate and 15 pounds of ammonium sulphate are added to about 20 to 25 gallons of water at 75°F. in, for example, a 55-gallon drum. Stirring is carried out until the lumps are gone, and then the anionic hydrophile and the non-ionic hydrophile are slowly added so as to avoid clumping. Lastly, 15 pounds of ammonium chloride is added with stirring until the lumps are gone. Warm water (e.g., 150°F.) is then slowly added to fill the drum. Such warm water is needed to avoid any sharp temperature drop that could be caused by the dissolution of the ammonium chloride which is endothermic and which could adversely affect the solubility of the catalyst components.

It should, of course, be appreciated that the catalyst could be formed as a slurry concentrate to minimize the transportation expenses if the catalyst system is not made at the same location as where it will be used.

It should be appreciated that the amount of catalyst used and the proportions of the ingredients of the catalyst system may vary within wide limits depending upon the economics involved and the results desired. As the amount of each ingredient of the catalyst system is decreased relative to a specific amount of ore being leached with a specific quantity of mother liquor, the benefits achieved by utilizing the catalyst system also decrease. On the other hand, increasing the effective amount of the ingredients of the catalyst system above certain levels begins to increase the cost faster than is warranted due to increased performance. Excessive amounts of the hydrophiles can lead to foaming or gel formation, and these are undesirable and should be avoided.

Functionally, in relation to a specific amount of ore being leached with a specific amount of mother liquor, the various ingredients of the catalyst system should be present in amounts sufficient to the mother liquor to improve the extraction-recovery relationship of the leach. Thus, the free nitrate and chloride ions should be present in amounts sufficient to increase the rate and amount of the solubilizing of the copper or other element being recovered by oxidizing the ore. The ammonium ions should be present in sufficient quantity to increase the rate at which the cations being recovered are transported from the ore-mother liquor interface into the mother liquor and to minimize interference from other cations. The anionic hydrophile should be present in an amount sufficient to decrease surface tension at the ore-mother liquor interface and to increase the rate of transfer of the cations in the ore being recovered from this interface into the bulk mother liquor. The non-ionic hydrophile, when included, should also be present in an amount effective to decrease the surface tension at the ore-mother liquor interface. The amount of polar solvent should, obviously, be sufficient to dissolve the various components. For use with one ton of an ore such as a copper ore being leached with a mother liquor comprising of about 2,000 pounds of water and 200 pounds of sulphuric acid (99 plus % concentration), there may be used from about 0.0022 pounds to about 200 pounds for each of the nitrate, chloride and ammonium ions, from about 0.022 pounds to about 20 pounds for the anionic hydrophile and from about 2×10⁻⁵ pounds to about 20 pounds of a non-ionic hydrophile.

Thus, the present invention provides a catalyst system for improving the leaching of an element from its ores by increasing the amount leached in a given time. It is hypothesized that the subject catalyst functions to increase the rate of oxidation and solubilization of the copper or other element being leached, exposes greater surface area of the ore to the action of the mother liquor, improves the rate of transfer of the solubilized copper or other cations from the ore-mother liquor interface into the bulk mother liquor and minimizes interference from other cations that may be present.

To achieve such salutary effects, it should be appreciated that the catalyst system should be separately formulated and then added to the mother liquor. While there may be some effect derived from adding the various ingredients directly to the mother liquor, the resulting improvement is generally minimal because of the dispersing of the minor amounts of the catalyst ingredients into the gross amount of the mother liquor before the catalyst components can react or function together. Specifically, it is desirable to allow opportunity for complexing of the ammonium ions with the anionic hydrophile prior to dispersion into the mother liquor.

I claim as my invention:

1. A catalyst system for addition to an aqueous mother liquor solution to improve the leaching of elements such as cobalt, nickel, zinc, copper, uranium, cadmium, tin, thorium or silver from their ores which comprises, per ton of ore and about 2200 pounds of mother liquor, a chloride ion source selected from the group consisting of ammonium chloride, hydrogen chloride, lithium chloride, potassium chloride, and sodium chloride, a nitrate ion source selected from the group consisting of ammonium nitrate, nitric acid, lithium nitrate, potassium nitrate and sodium nitrate, and an ammonium ion source selected from the group consisting of ammonium sulphate, ammonium sulfite, ammonium fluoride and ammonium bifluoride, the amounts of the chloride, nitrate and ammonium ion sources being present in amounts sufficient to provide in the mother liquor from about 0.0022 lbs. to about 200 lbs. of each ion, with the proviso that the total amount of the ammonium ions may be provided by a member selected from the group consisting of ammonium chloride, ammonium nitrate and mixtures thereof, an anionic hydrophile selected from the group consisting of sodium dodecylatedoxydibenzene disulfonate, sodium lauryl sulphate, sodium N-alkylcarboxy sulfosuccinate, sodium alkylsulfosuccinate, polyalkanolamine-fatty acid condensate, sodium alkylbiphenyl sulfonate, sodium alkylnaphthalene sulfonate and sodium dodecylbenzene sulfonate, and present in an amount of from about 0.02 lbs. to about 20 lbs., and a polar solvent present in an amount sufficient to allow dissolution therein of the components of the catalyst system.

2. The catalyst system of claim 1 which includes a non-ionic hydrophile present in an amount sufficient to improve the wetting of the ore.

3. The catalyst system of claim 2 wherein the non-ionic hydrophile is a polyoxyethylene ether having a distribution mean molecular weight between from about 78 to about 250.

4. The catalyst system of claim 1 wherein the chloride and nitrate ion sources are ammonium chloride and ammonium nitrate.

5. A catalyst system for addition to an aqueous mother liquor solution to improve the leaching of elements such as cobalt, nickel, zinc, copper, uranium, cadmium, tin, thorium or silver from their sources which comprises a chloride ion source selected from the group consisting of ammonium chloride, hydrogen chloride, lithium chloride, potassium chloride, and sodium chloride, a nitrate ion source selected from the group consisting of ammonium nitrate, nitric acid, lithium nitrate, potassium nitrate and sodium nitrate, the chloride and nitrate sources being present in amounts sufficient, when added to the mother liquor, to increase the rate of oxidizing and solubilizing of the element being leached, an ammonium ion source selected from the group consisting of ammonium sulphate, ammonium sulfite, ammonium fluoride and ammonium bifluoride, with the proviso that a separate ammonium ion source may be omitted when either ammonium chloride or ammonium nitrate are present, the ammonium ions being present in an amount sufficient in the mother liquor to increase the rate of transfer of the solubilized element from the ore-mother liquor interface into the bulk mother liquor and to minimize interference from other cations present, an anionic hydrophile present in an amount sufficient, in the mother liquor to increase the rate of transfer of the solubilized element from the ore-mother liquor interface into the bulk mother liquor and to decrease the surface tension at the ore-mother liquor interface, a polar solvent for the components of the catalyst system.

* * * * *